United States Patent
Nakada

(10) Patent No.: US 9,024,499 B2
(45) Date of Patent: May 5, 2015

(54) ROTATING ELECTRIC MACHINE ROTOR

(75) Inventor: Tohru Nakada, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 171 days.

(21) Appl. No.: 13/812,318

(22) PCT Filed: Jul. 25, 2011

(86) PCT No.: PCT/JP2011/066825
§ 371 (c)(1),
(2), (4) Date: Jan. 25, 2013

(87) PCT Pub. No.: WO2012/014834
PCT Pub. Date: Feb. 2, 2012

(65) Prior Publication Data
US 2013/0119807 A1 May 16, 2013

(30) Foreign Application Priority Data
Jul. 28, 2010 (JP) .................. 2010-169464

(51) Int. Cl.
*H02K 21/12* (2006.01)
*H02K 1/27* (2006.01)

(52) U.S. Cl.
CPC ............ *H02K 1/2706* (2013.01); *H02K 1/2766* (2013.01)

(58) Field of Classification Search
USPC .............. 310/156.53, 156.54, 156.56, 156.57
See application file for complete search history.

(56) References Cited

U.S. PATENT DOCUMENTS

| 5,818,139 A | 10/1998 | Yamagiwa et al. |
| 8,536,748 B2* | 9/2013 | Liang et al. ............... 310/156.53 |
| 8,698,369 B2* | 4/2014 | Hisada ..................... 310/156.53 |
| 2004/0080228 A1 | 4/2004 | Ahn et al. |
| 2007/0284960 A1* | 12/2007 | Fulton et al. ............. 310/156.53 |
| 2008/0007131 A1* | 1/2008 | Cai et al. ................ 310/156.38 |

FOREIGN PATENT DOCUMENTS

| CN | 1492566 A | 4/2004 |
| CN | 101501969 A | 8/2009 |
| JP | 2000-050546 A | 2/2000 |
| JP | 2000-102202 A | 4/2000 |
| JP | 2003-143788 A | 5/2003 |
| JP | 2010-022156 A | 1/2010 |
| WO | WO 96/03793 A1 | 2/1996 |

OTHER PUBLICATIONS

Japanese Office Action dated Dec. 3, 2013, (3 pgs.).
Chinese Office Action dated Aug. 5, 2014, 7 pgs.

* cited by examiner

*Primary Examiner* — Dang Le
(74) *Attorney, Agent, or Firm* — Foley & Lardner LLP

(57) ABSTRACT

A rotating electric machine rotor is equipped with a rotor core and a pair of permanent magnets disposed in a V-shape that opens toward an outer periphery of the rotor core. The pair of permanent magnets is separated in an inner periphery direction of the rotor core, and the rotor core contains a gap formed by connecting between at least the separated permanent magnets.

3 Claims, 12 Drawing Sheets ically angle of 90°) of a cross section perpendicular to a rotor shaft. FIG. 2 are partial
ROTATING ELECTRIC MACHINE ROTOR

TECHNICAL FIELD

The present disclosure relates to a rotor used for a rotating electric machine.

BACKGROUND

According to a magnet embedded type permanent magnet motor that has permanent magnets embedded in a rotor core (an interior permanent magnet motor (hereinafter referred to as an "IPM motor" as necessary)), a current phase is controlled biaxially by a d-axis current and a q-axis current. As a result of this, a magnetic field of the permanent magnets is weakened, reluctance torque is effectively used, and high output operation can be made over a wide range.

Further, it is possible particularly for the IPM motor in which the magnets are disposed in a V-shape to effectively use both of torque of the permanent magnets (magnet torque) and the reluctance torque. As a result of this, the output can be improved further.

When a demagnetization field is applied to the permanent magnets by passing the d-axis current, the magnetic field of the permanent magnets is weakened. However, when the demagnetization field is increased, irreversible demagnetization of the permanent magnets may be caused. Particularly, according to the IPM motor in which the magnets are disposed in the V-shape, it is likely that the demagnetization field is concentrated in the vicinity of the d-axis and the irreversible demagnetization is caused.

Meanwhile, according to JP2003-143788A, gaps are formed at end faces on a d-axis side of the magnets. As a result of this, magnetic resistance at an area in the vicinity of the d-axis is increased, the demagnetization field that is caused locally in the vicinity of the d-axis is prevented from passing through the permanent magnets, and the irreversible demagnetization is avoided.

SUMMARY

According to JP2003-143788A, a bridge is formed between the two gaps formed in the vicinity of the d-axis. Thus, strength against centrifugal force can be obtained. When structured like this, however, magnetic flux of the permanent magnets leaks from the bridge, and the magnetic flux that links from the rotor to a stator to become a torque generation source (hereinafter referred to as "interlinkage magnetic flux" as necessary) is reduced. This results in the reduction in output torque.

The present disclosure is made in view of such conventional problems, and an object of the present disclosure is to provide a rotating electric machine rotor capable of preventing the reduction in the interlinkage magnetic flux and obtaining the high output torque.

Accordingly to an embodiments of the present invention, a rotating electric machine rotor having a rotor core, and a pair of permanent magnets disposed in a V-shape that opens toward an outer periphery of the rotor core is provided. The pair of permanent magnet is separated in an inner periphery direction of the rotor core, and the rotor core contains a gap formed by connecting between at least the separated permanent magnets.

Embodiments and advantages of this invention will be described in detail below together with the attached figures.

DESCRIPTION OF EMBODIMENTS

First Embodiment

Figure 1:
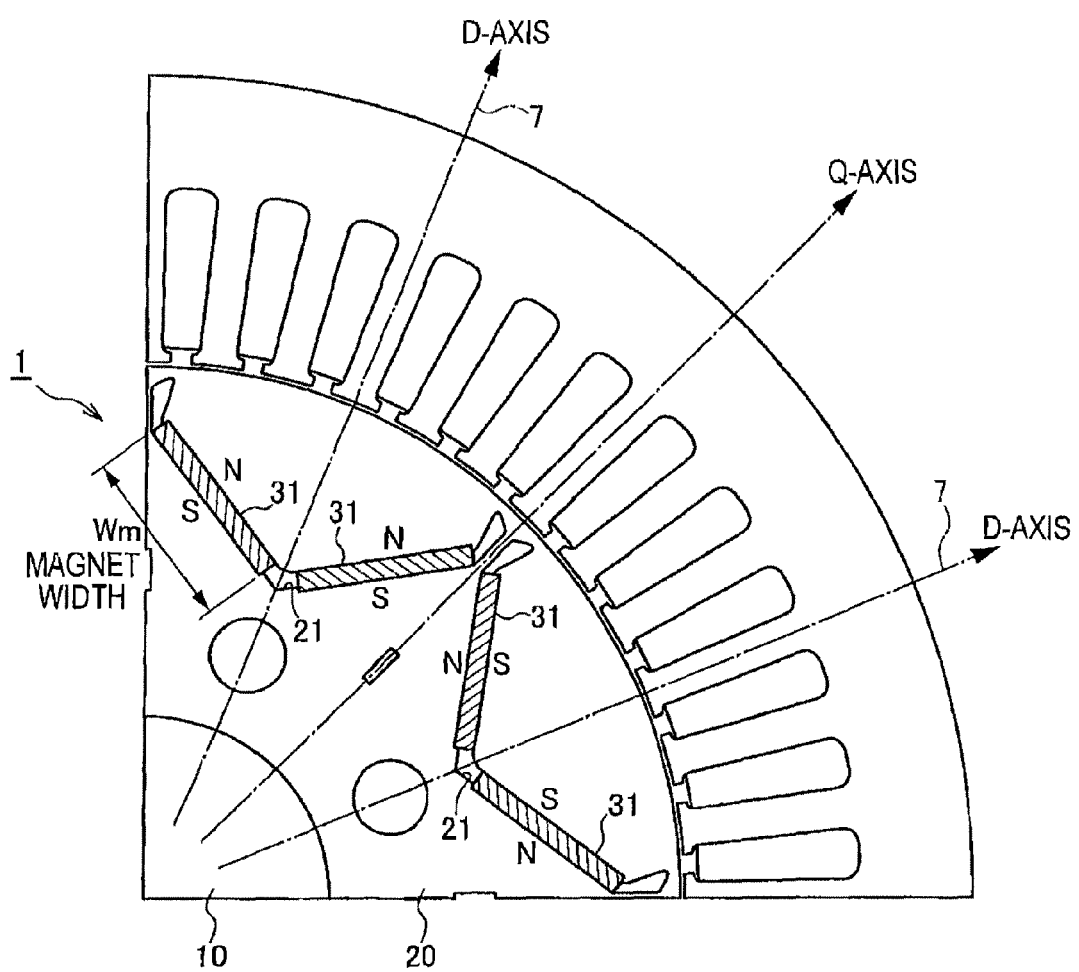
FIG. 1 is a view of a rotating electric machine rotor according to a first embodiment of the present invention.
Figure 2A:
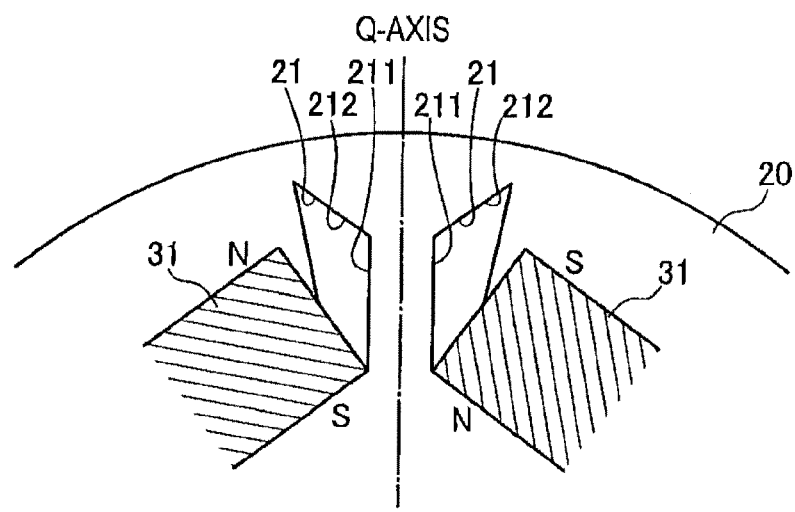
FIG. 2A is a partial enlarged view of FIG. 1, showing the vicinity of the tip of a gap formed in a rotor core.
Figure 2B:
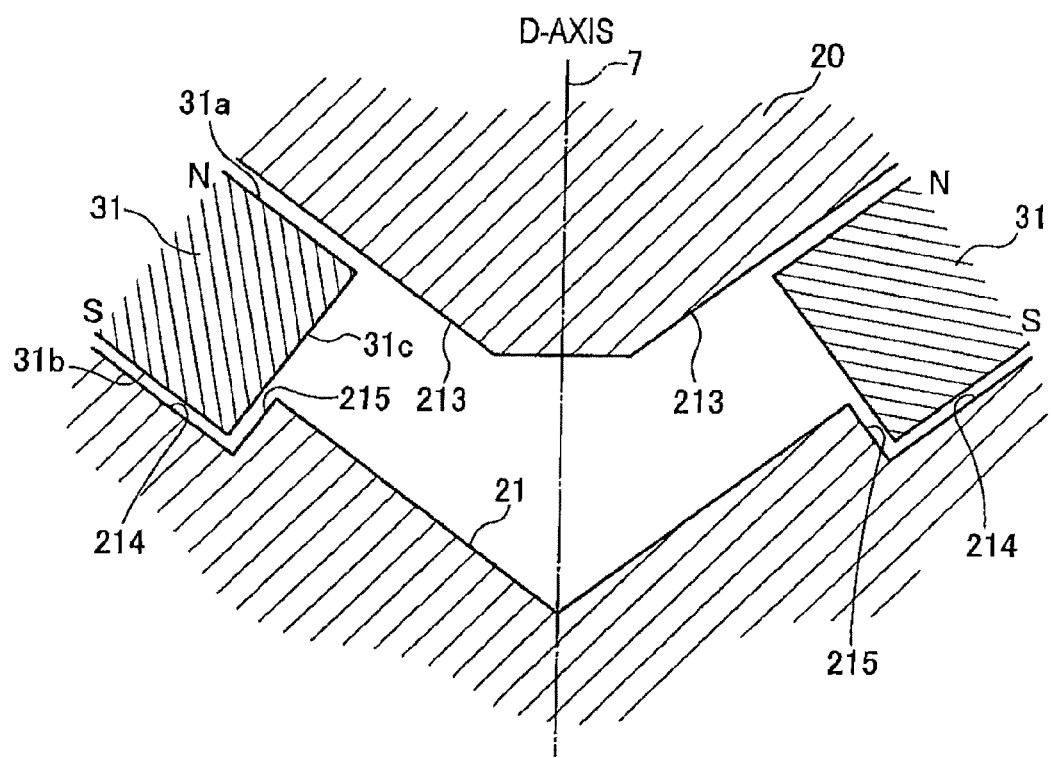
FIG. 2B is a partial enlarged view of FIG. 1 and is an enlarged view showing the vicinity of the base of the gap formed in the rotor core on a rotor shaft side.

FIG. 1 is a view of a rotating electric machine rotor according to a first embodiment of the present invention, showing ¼ of the whole circumference (mechanical angle of 90°) of a cross section perpendicular to a rotor shaft. FIG. 2 are partial enlarged views of FIG. 1, FIG. 2A showing the vicinity of the tip of a gap formed in a rotor core, and FIG. 2B being an enlarged view showing the vicinity of the base of the gap formed in the rotor core on a rotor shaft side.

A rotating electric machine rotor 1 includes a rotor shaft 10, a rotor core 20, and groups 30 of permanent magnets 31.

The rotor shaft 10 is a rotating shaft of the rotor 1.

As shown in FIG. 1, the rotor core 20 is provided around the rotor shaft 10. The rotor core 20 is formed by laminating a multiple number of electromagnetic steel plates in a direction of the rotor shaft. In the rotor core 20, groups of gaps 21 that are line-symmetric with respect to symmetry axes 7 are formed. A base portion on the rotor shaft side of each of the gaps 21 extends to the symmetry axis 7. A tip portion is separated away from the symmetry axis 7 and brought closer to a q-axis and to an outer periphery of the rotor, as shown in FIG. 2A. A q-axis side inner wall surface 211 at the tip of the gap 21 is parallel to the q-axis. An outer periphery side inner wall surface 212 at the tip of the gap 21 is brought closer to an outer periphery surface as it is separated from the q-axis. Further, as shown in FIG. 2B, the base portion of the gap 21 includes an abutting surface 215 that is convexly provided toward the inside from a rotor shaft side inner wall surface 214 of the inner wall surface facing against a pole face of the permanent magnet, and that is abutted against a side surface 31c of the permanent magnet to separate the side surface 31c of the permanent magnet from the symmetry axis 7.

As shown in FIG. 1, the permanent magnet groups 30 are formed in the rotor core 20. Each of the permanent magnet groups 30 is a group having a pair of the permanent magnets 31 inserted for each of the gaps 21. As the gap 21 is line-symmetric with respect to the symmetry axis 7, the pair of the permanent magnets 31 is also line-symmetric with respect to the symmetry axis 7. One polarity is formed by the pair of the permanent magnets 31. In FIG. 1, the upper pair of the permanent magnets 31 has an N-pole on an outer periphery side of the rotor, and an S-pole on the rotor shaft side. The lower pair of the permanent magnets 31 has an S-pole on the outer periphery side of the rotor, and an N-pole on the rotor shaft side. When such a structure is employed, d-axes of the permanent magnets 31 correspond to the symmetry axes 7.

As shown in FIG. 2B, an outer periphery side inner wall surface 213 at the base portion of the inner wall surface of the gap 21, which faces against the pole face of the permanent magnet 31, is longer than a magnet width of the permanent magnet 31. Therefore, a pole face 31a of the permanent magnet 31 (an N-pole surface in FIG. 2B) faces against the inner wall surface 213 of the gap 21 over its entire length. Further, the rotor shaft side inner wall surface 214 at the base portion of the inner wall surface of the gap 21, which faces against the pole face of the permanent magnet 31, has the same length as the magnet width of the permanent magnet 31. Therefore, a pole face 31b of the permanent magnet 31 (an S-pole surface in FIG. 2B) also faces against the inner wall surface 214 of the gap 21 over its entire length. The side surface 31c of the permanent magnet 31 abuts against the abutting surface 215 of the gap 21. The side surface 31c of the permanent magnet 31 is separated from the symmetry axis 7.

Next, the operations and effects of this embodiment will be explained.

Figure 10A:
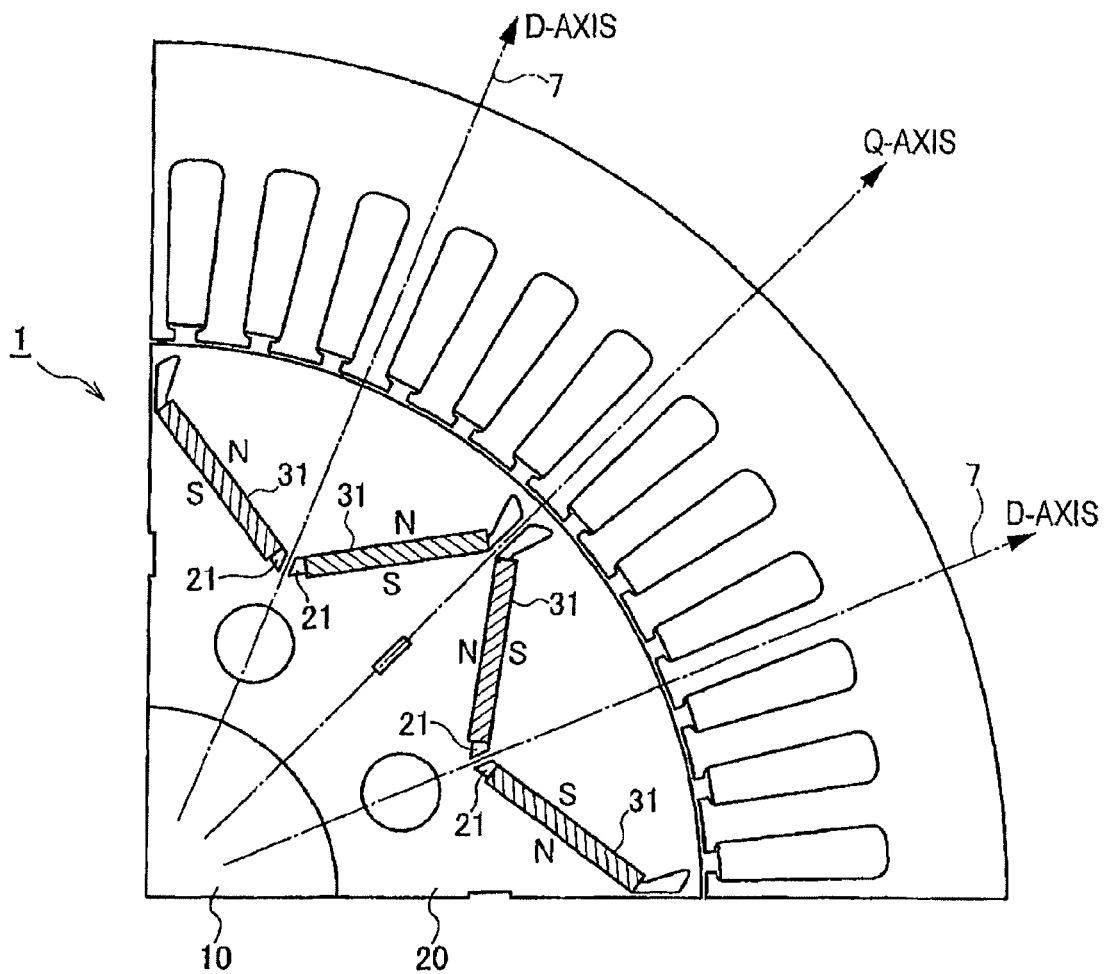
FIG. 10A is a view of a first comparative example, showing ¼ of the whole circumference (mechanical angle of 90°) of the cross section perpendicular to the rotor shaft.
Figure 10B:
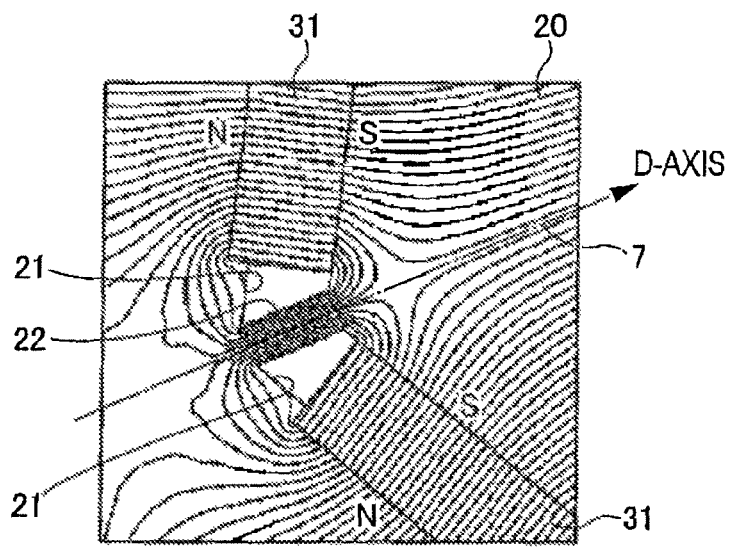
FIG. 10B is a view of the first comparative example, and is an enlarged view showing the vicinity of the base of the gap formed in the rotor core on the rotor shaft side, and showing the distribution of magnetic flux.

FIG. 10 are views showing a first comparative example, FIG. 10A showing ¼ of the whole circumference (mechanical angle of 90°) of the cross section perpendicular to the rotor shaft, and FIG. 10B being an enlarged view showing the vicinity of the base of the gap formed in the rotor core on the rotor shaft side, and showing the distribution of magnetic flux.

It should be noted that, in the following description, the same numerals and symbols will be used to designate the same components that function similarly to the above, so as to omit the repeated explanation appropriately.

According to this embodiment, as shown in FIG. 2B, the gap 21 is line-symmetric with respect to the symmetry axis 7, and the base portion thereof on the rotor shaft side extends to the symmetry axis 7. Thus, the gap 21 is formed by one gap extending across the symmetry axis 7.

According to the first comparative example, on the other hand, the base portion on the rotor shaft side of the gap 21 does not reach the symmetry axis 7, as shown in FIG. 10B. Specifically, the gap 21 is separated into two with the symmetry axis 7 therebetween, and a bridge 22 is formed between the gaps 21. When such a structure is employed, the magnetic flux of the permanent magnets leaks from the bridge 22, as shown in FIG. 10B, which causes the reduction in interlinkage magnetic flux that links from the rotor to a stator to become a torque generation source. This results in the reduction in output torque.

On the contrary, according to this embodiment as shown in FIG. 2B, the gap 21 is line-symmetric with respect to the symmetry axis 7, with its base on the rotor shaft side extending to the symmetry axis 7, and the gap 21 is formed by one gap extending across the symmetry axis 7. Therefore, the bridge that exists in the comparative example does not exist, so that the leakage of the magnetic flux of the permanent magnets can be reduced, and the reduction in the interlinkage magnetic flux can be prevented. In other words, the torque reduction can be prevented.

Further, this embodiment does not have the bridge that is provided in the comparative example to act against centrifugal force. Therefore, it may seem that stress of the centrifugal force concentrates on an area between the poles (q-axis area) and centrifugal force resistant strength is reduced. However, the gap 21 of this embodiment is formed to be able to disperse the stress of the centrifugal force concentrating on the q-axis area, and to withstand the centrifugal force during rotation by only an iron core (steel plate) at the q-axis area. Specifically, according to the gap 21 of this embodiment, the tip is separated from the symmetry axis 7 and brought closer to the q-axis, as shown in FIG. 2A. Further, the q-axis side inner wall surface 211 of the gap 21 is parallel to the q-axis. Furthermore, the outer periphery side inner wall surface 212 of the gap 21 is brought closer to the outer periphery surface as it is separated from the q-axis. With such structure, it is possible to disperse the stress of the centrifugal force concentrating on the q-axis area, withstand the centrifugal force during rotation by only the iron core (q-axis steel plate) on the q-axis, and prevent the reduction in the centrifugal force resistant strength. According to this embodiment in particular, the outer periphery side inner wall surface 212 of the gap 21 is brought closer to the outer periphery surface as it is separated from the q-axis, and an electromagnetic steel plate area is formed into a Y-shape, so that the stress of the centrifugal force can be effectively dispersed while keeping the thin width of the steel plate at the q-axis.

Figure 11:
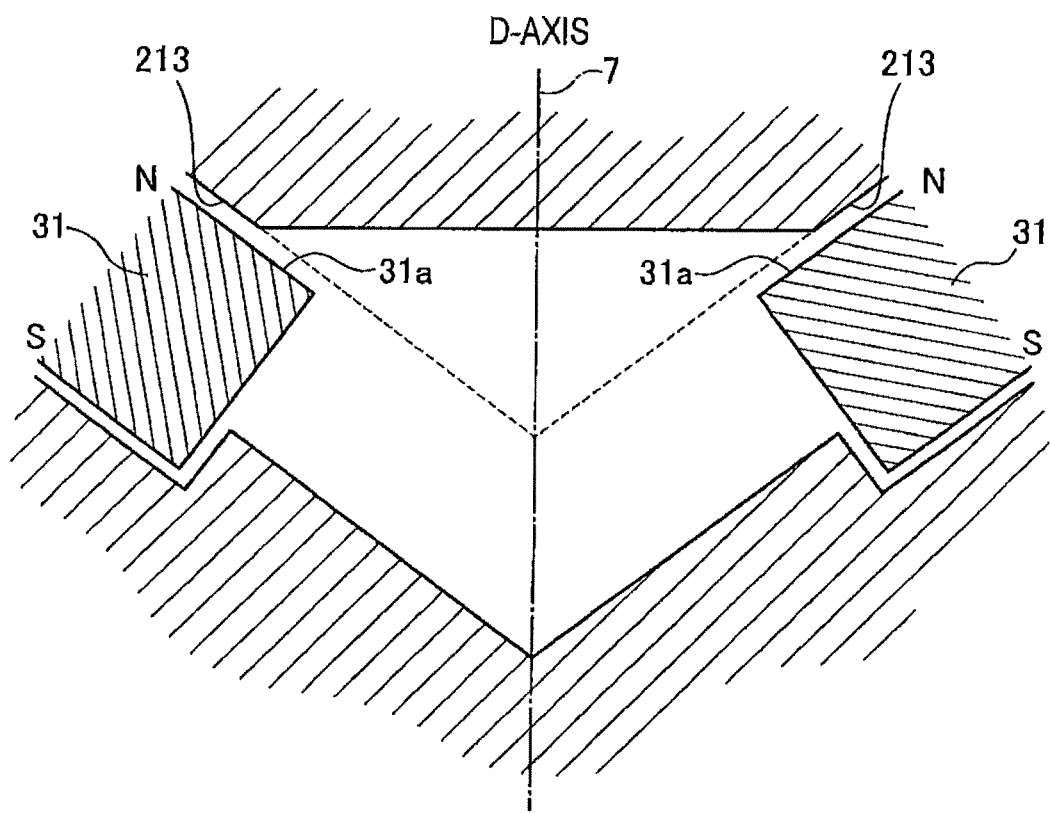
FIG. 11 is a view showing a second comparative example.

FIG. 11 is a view showing a second comparative example.

According to this embodiment, as shown in FIG. 2B, the outer periphery side inner wall surface 213, which faces against the pole face of the permanent magnet 31, is longer than the magnet width of the permanent magnet 31. Therefore, the pole face 31a of the permanent magnet 31 (the N-pole surface in FIG. 2B) faces against the inner wall surface 213 of the gap 21 over its entire length.

On the contrary, according to the second comparative example as shown in FIG. 11, the outer periphery side inner wall surface 213, which faces against the pole face of the permanent magnet 31, is shorter than the magnet width of the permanent magnet 31. Therefore, a part of the pole face 31a of the permanent magnet 31 (the N-pole surface in FIG. 11) does not face against the inner wall surface 213 of the gap 21.

The pole face 31a on the outer periphery side of the permanent magnet 31 is the surface having a significant influence on the amount of the interlinkage magnetic flux that is a main factor in torque generation. In order to allow more magnetic flux to link to a stator side from this surface, it is necessary to reduce the leakage flux by bringing the pole face 31a on the outer periphery side of the permanent magnet 31 as close to the rotor core 20 (the outer periphery side inner wall surface 213) as possible.

According to the structure like the second comparative example, the interlinkage magnetic flux is reduced because the pole face 31a on the outer periphery side is separated from the rotor core 20 (the outer periphery side inner wall surface 213).

On the contrary, according to this embodiment, the outer periphery side inner wall surface 213, which faces against the pole face of the permanent magnet 31, is longer than the magnet width of the permanent magnet 31, and therefore, the pole face 31a of the permanent magnet 31 (the N-pole surface in FIG. 2B) faces against the inner wall surface 213 of the gap 21 over its entire length. This makes it possible to prevent the reduction in the interlinkage magnetic flux. As a result of this, the torque reduction can be prevented.

Figure 3:
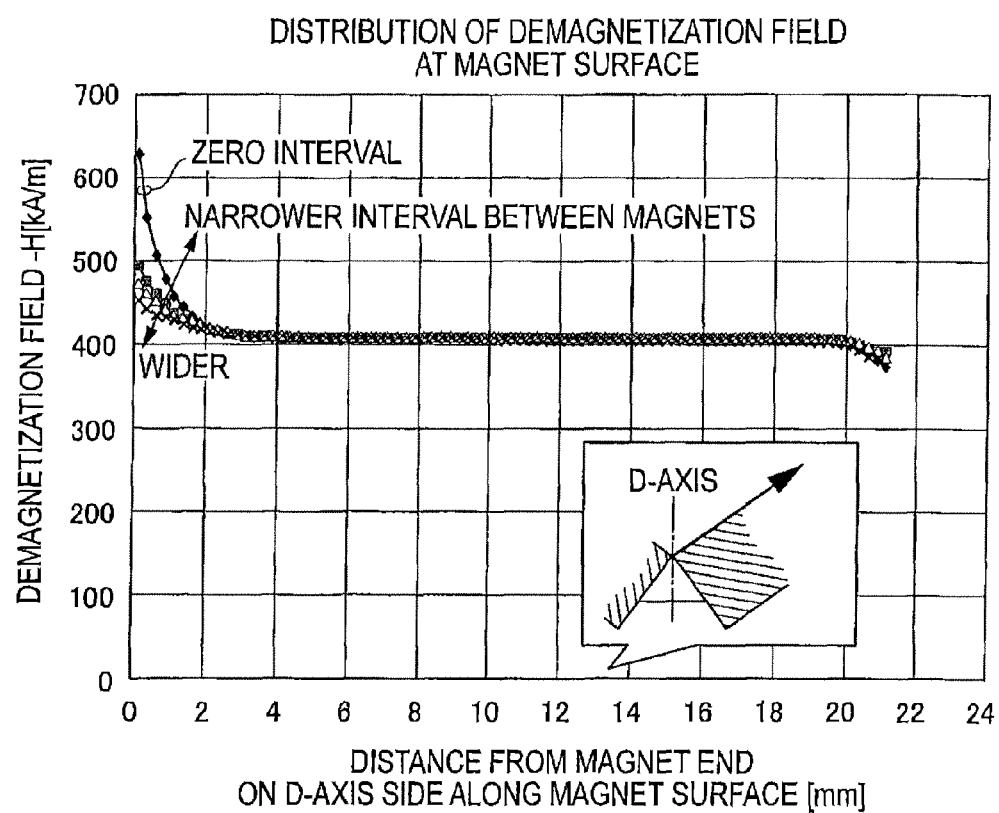
FIG. 3 is a graph explaining the effects of the first embodiment.

FIG. 3 is a graph explaining the further effects of this embodiment.

According to this embodiment, the side surface 31c of the permanent magnet 31 is separated from the symmetry axis 7. In other words, the two permanent magnets 31 are separated from each other without coming in contact with each other. When an interval between the two permanent magnets 31 is small (especially when the interval between the two permanent magnets 31 is zero and they are in contact with each other), a demagnetization field suddenly increases in the vicinity of the d-axis, as shown in FIG. 3. As a result, irreversible demagnetization is caused in the vicinity of the d-axis area of the permanent magnets 31.

On the contrary, according to this embodiment, the two permanent magnets 31 that are formed in a V-shape are separated from the d-axis, so that the effects of the demagnetization field concentrating locally in the vicinity of the d-axis are eased, the irreversible demagnetization can be avoided, and demagnetization resistance performance is improved.

As the demagnetization resistance performance is improved, a current to be input is improved, and the reduction in the interlinkage magnetic flux is avoided. As a result, the torque is improved drastically.

Second Embodiment

Figure 4A:
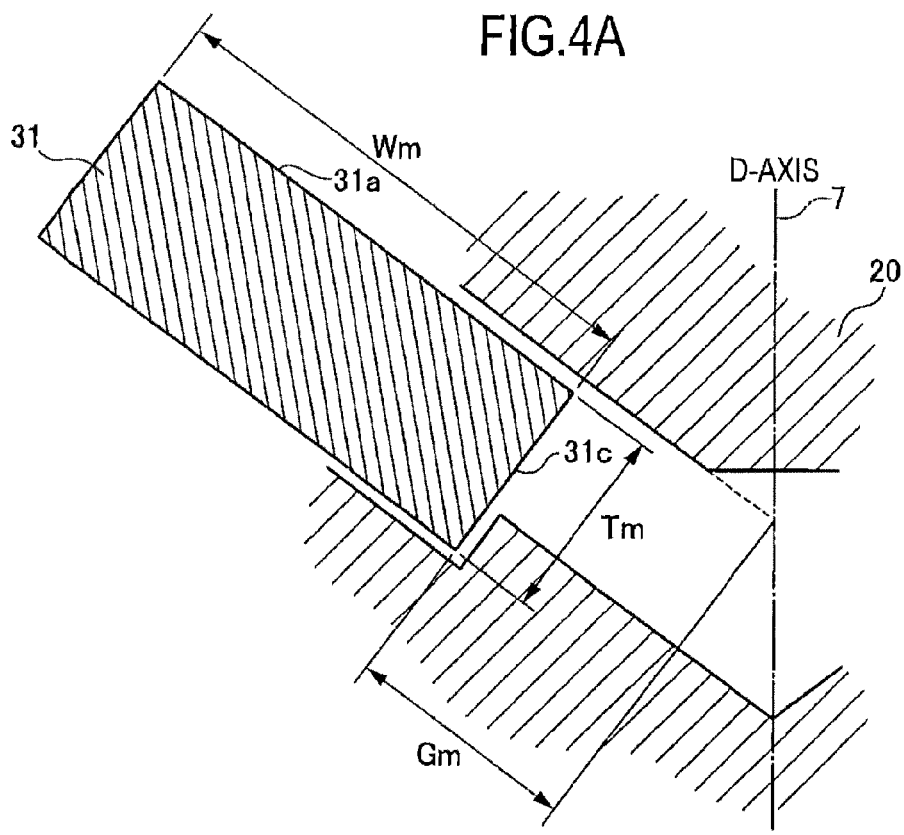
FIG. 4A is a view of the rotating electric machine rotor according to a second embodiment of the present invention, showing the case where a rectangular magnet is employed.
Figure 4B:
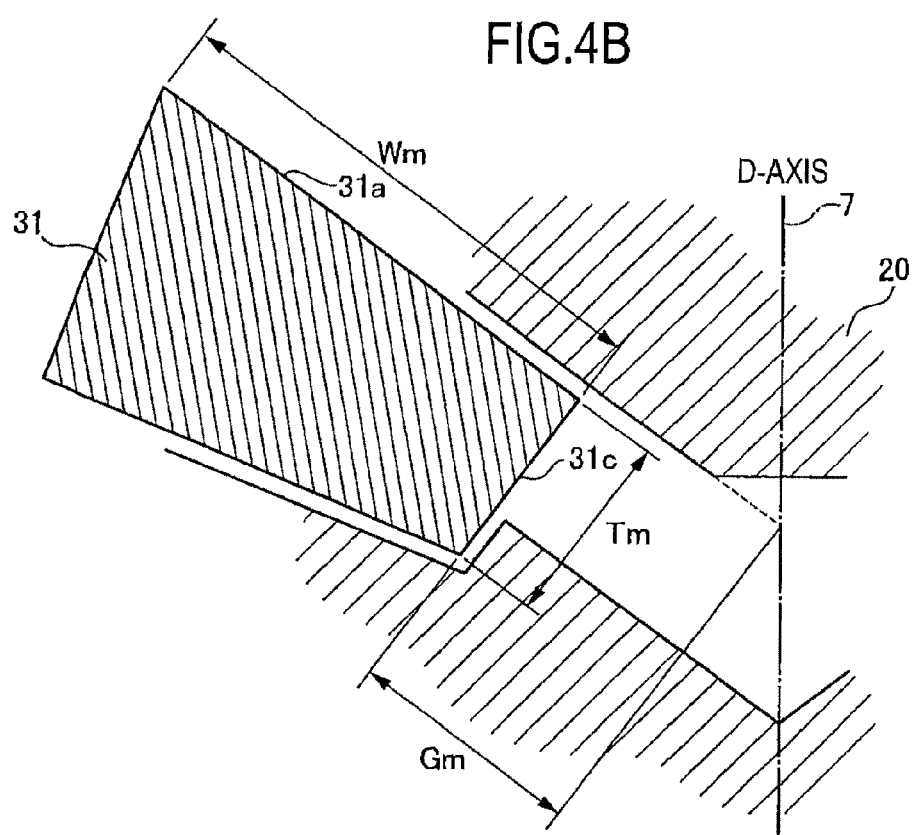
FIG. 4B is a view of the rotating electric machine rotor according to the second embodiment of the present invention, showing the case where a magnet, which is not rectangular and whose surfaces are not parallel to each other, is employed.

FIG. 4 are views of the rotating electric machine rotor according to a second embodiment of the present invention, showing the cross section perpendicular to the rotor shaft in the vicinity of the base on the rotor shaft side of the gap formed in the rotor core. FIG. 4A shows the case where a rectangular magnet is employed, and FIG. 4B shows the case where a magnet, which is not rectangular and whose surfaces are not parallel to each other, is employed.

With the permanent magnet which is not rectangular and whose surfaces are not parallel to each other, as shown in FIG. 4B, a magnet width Wm is the length of the pole face 31a on the outer periphery side. Further, a magnet thickness Tm is the length of the side surface 31c on the d-axis (symmetry axis 7) side.

At this time, a clearance between the magnets Gm is made larger as the magnet width Wm is increased, and made smaller as the magnet thickness Tm is increased. In other words, the following formula (1) is satisfied:

[Formula 1]

$$Gm = \frac{Wm}{Tm} \times a \quad (1)$$

where α is a value determined from magnet characteristics.

Being thus structured, it is possible to easily derive a unique clearance dimension between the magnets whatever the shape of the permanent magnet is, including the permanent magnet which is not rectangular and whose surfaces are not parallel to each other.

As the clearance between the magnets Gm is secured, the two permanent magnets 31 formed in a V-shape are separated from the d-axis, so as to ease the effects of the demagnetization field concentrating locally in the vicinity of the d-axis, to prevent the irreversible demagnetization, and to improve the demagnetization resistance performance.

Third Embodiment

Figure 5:
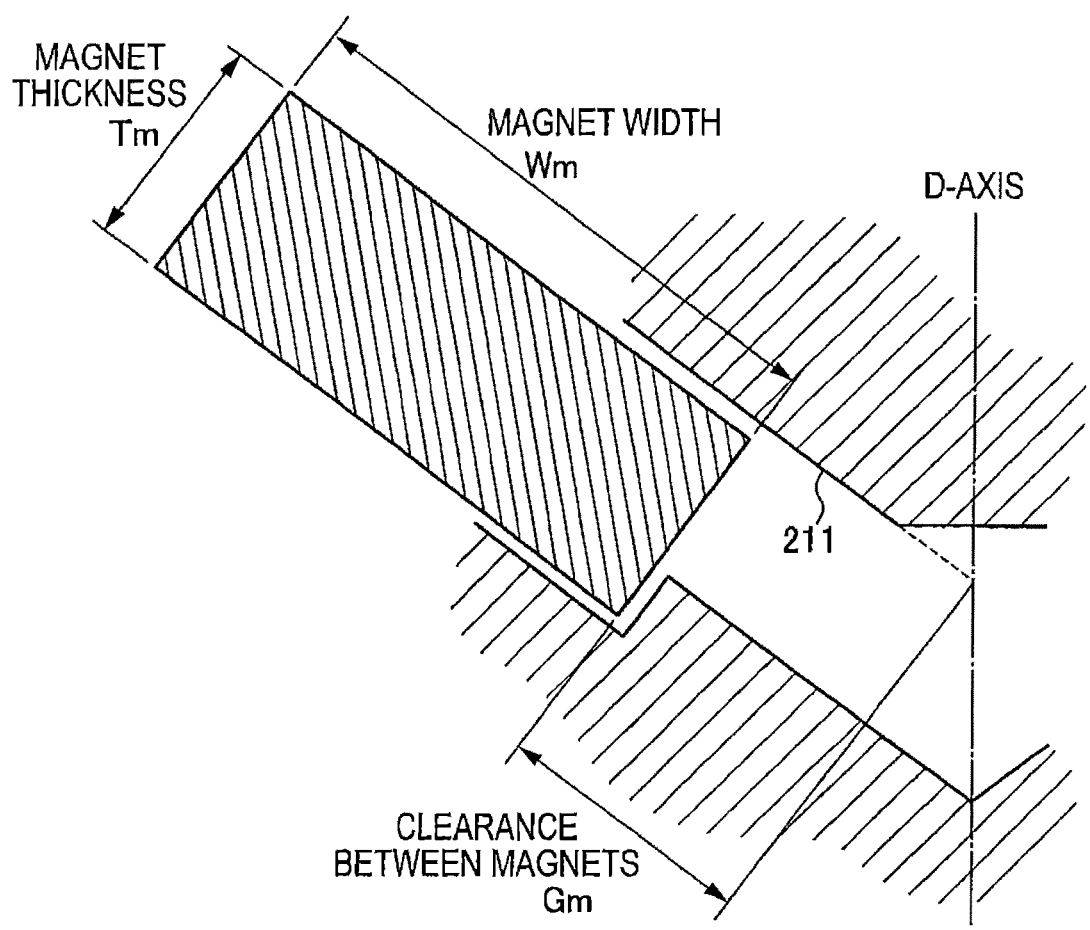
FIG. 5 is a view of the rotating electric machine rotor according to a third embodiment of the present invention.

FIG. 5 is a view of the rotating electric machine rotor according to a third embodiment of the present invention, showing the cross section perpendicular to the rotor shaft in the vicinity of the base on the rotor shaft side of the gap formed in the rotor core.

According to this embodiment, the following formula (2) is satisfied where the clearance between the magnets is Gm, the magnet thickness is Tm, and the magnet width is Wm.

[Formula 2]

$$0 < \left(Gm \times \frac{Tm}{Wm}\right) \leq 0.25 \quad (2)$$

Incidentally, the clearance between the magnets Gm is an interval between the permanent magnet 31 and the d-axis (symmetry axis 7). In other words, the clearance between the magnets Gm is an interval between the side surface 31c of the permanent magnet 31 and an intersection between an extension line of the outer periphery side inner wall surface 213 of the gap 21 and the d-axis (symmetry axis 7).

Figure 6:
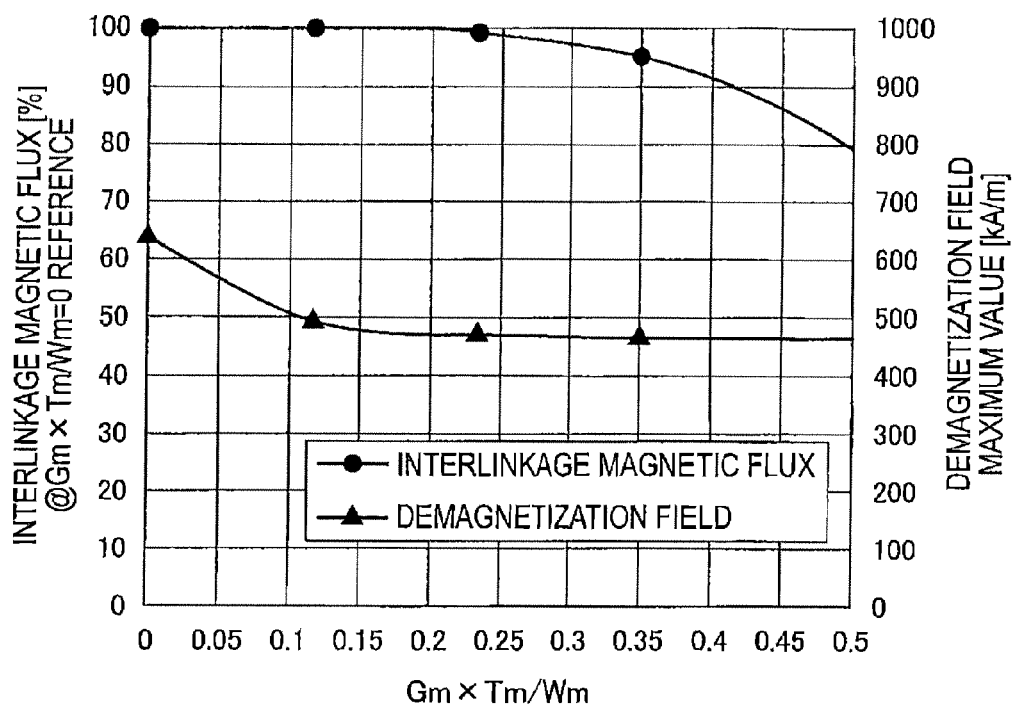
FIG. 6 is a graph explaining the operations and effects of the formula (2).

FIG. 6 is a graph explaining the operations and effects of the formula (2).

First, as is clear from the transition of a demagnetization field maximum value, "demagnetization field maximum value" has the maximum value when Gm×Tm/Wm is 0. As the Gm×Tm/Wm is increased, the demagnetization field maximum value is reduced. It becomes almost saturated when the demagnetization field maximum value is about 0.15, but is gently reduced after that. In other words, when Gm×Tm/Wm is increased on purpose, it is possible to reduce the demagnetization field maximum value.

Next, it is clear that the interlinkage magnetic flux is reduced from when Gm×Tm/Wm is about 0.25. This is because, when the magnet is separated from the d-axis, a interlinkage magnetic flux waveform is distorted, an electrical primary component caused by the torque is reduced, and a high frequency component that is not caused by the torque is increased. However, it is clear that the primary component of the interlinkage magnetic flux is not reduced until when Gm×Tm/Wm is 0.25.

From the above-described description, it is clear that the structure according to the above formula (2) can achieve the maximum effect, as it reduces the demagnetization field maximum value but does not reduce the interlinkage magnetic flux.

The above-described embodiments are not restrictive and various modifications and changes can be made within the scope of the technical ideas, which are obviously included in the technical scope of the present invention.

As described above, it is necessary for the gap 21 on the base side to be formed to reach the symmetry axis 7, to have the inner wall surface 213 facing against the pole face 31a of the permanent magnet 31 over its entire length, and to have the abutting surface 215 convexly provided toward the inside from the rotor shaft side inner wall surface 214 and abutted against the side surface 31c of the permanent magnet.

Figure 7A:
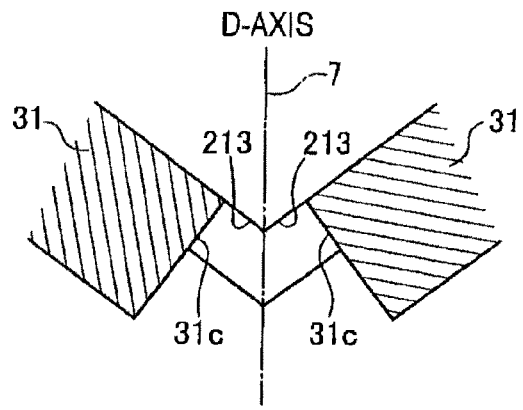
FIG. 7A is a view showing the base portion of the gap according to another embodiment.

Then, for example, it may have such a shape that the inner wall surface 213 is extended to reach the symmetry axis 7 (d-axis), as shown in FIG. 7A.

Figure 7B:
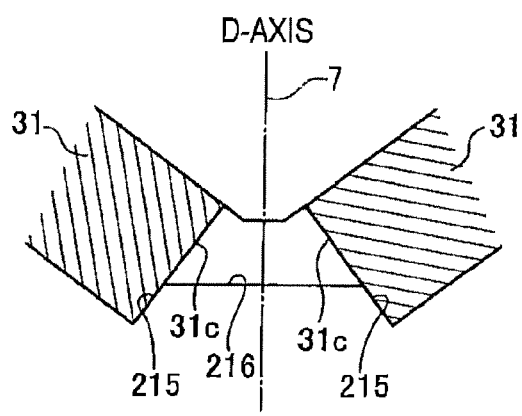
FIG. 7B is a view showing the base portion of the gap according to another embodiment.

Alternatively, as shown in FIG. 7B, it may have such a shape that an inner wall surface 216 on the rotor shaft side of the gap 21 is extended from an end surface 31c of the permanent magnet 31 to intersect the symmetry axis 7 (d-axis) at right angles.

Figure 7C:
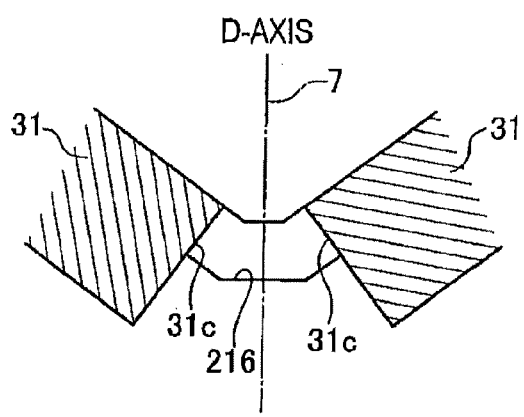
FIG. 7C is a view showing the base portion of the gap according to another embodiment.

Alternatively, as shown in FIG. 7C, it may have such a shape that the inner wall surface 216 is extended in parallel to the pole face of the permanent magnet 31 and then made to intersect the symmetry axis 7 (d-axis) at right angles.

Figure 7D:
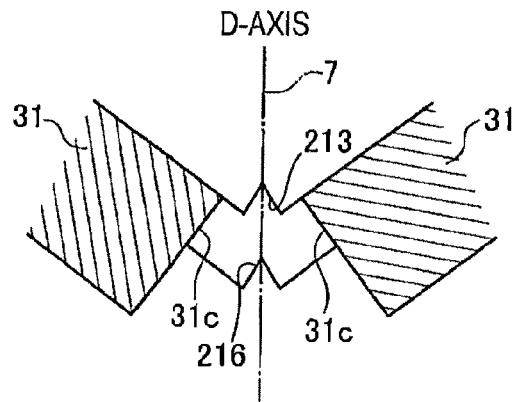
FIG. 7D is a view showing the base portion of the gap according to another embodiment.

Further, as shown in FIG. 7D, it may have such a shape that the outer periphery side inner wall surface 213 is formed convexly toward the outer periphery side, and the inner wall surface 216 on the rotor shaft side is also formed convexly toward the outer periphery side.

Figure 7E:
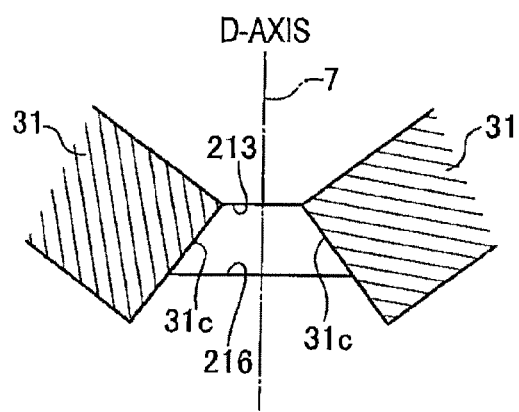
FIG. 7E is a view showing the base portion of the gap according to another embodiment.

Furthermore, as shown in FIG. 7E, it may have such a shape that the outer periphery side inner wall surface 213 is also extended from the end surface 31c of the permanent magnet 31 to intersect the symmetry axis 7 (d-axis) at right angles, although the shape is similar to the one shown in FIG. 7B.

Figure 7F:
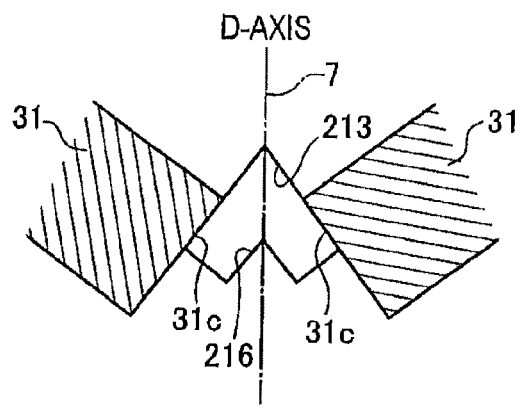
FIG. 7F is a view showing the base portion of the gap according to another embodiment.

Moreover, as shown in FIG. 7F, it may have such a shape that the outer periphery side inner wall surface 213 is also formed convexly from the end surface 31c of the permanent magnet 31 toward the outer periphery side, although the shape is similar to the one shown in FIG. 7D.

Figure 8:
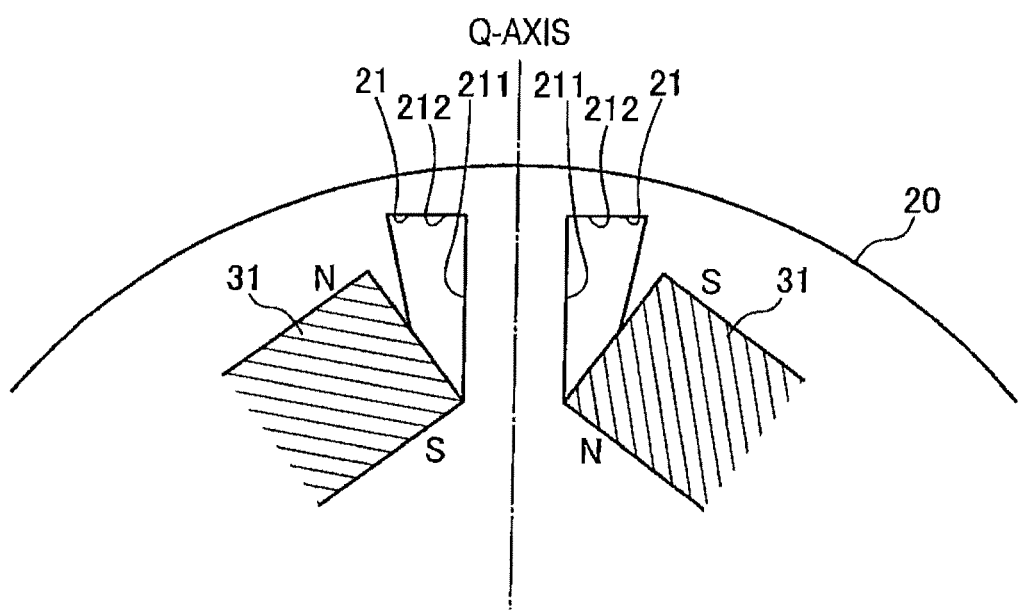
FIG. 8 is a view showing the tip portion of the gap according to another embodiment.

According to the above-described embodiments, the outer periphery side inner wall surface 212 at the tip of the gap 21 is brought closer to the outer periphery surface as it is separated from the q-axis (FIG. 2A), but it may be arranged to intersect the inner wall surface 211 at right angles as shown in FIG. 8. At this time, the area of the electromagnetic steel plate is formed to have a T-shape. Being thus-structured, it is also possible to disperse the stress of the centrifugal force concentrating on the q-axis area. Further, it is possible to prevent the reduction in the centrifugal force resistant strength. Incidentally, it is desirable that the steel plate width of the q-axis area is increased in this case, as compared with the case when it is formed in the Y-shape.

Figure 9A:
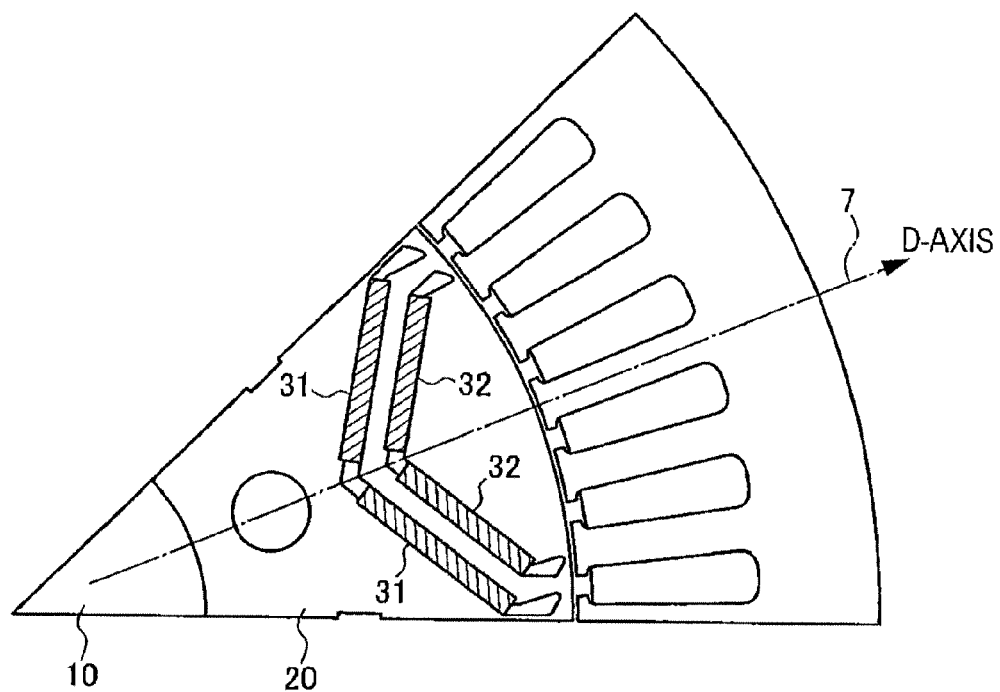
FIG. 9A is a view showing an embodiment in which permanent magnets are further disposed.
Figure 9B:
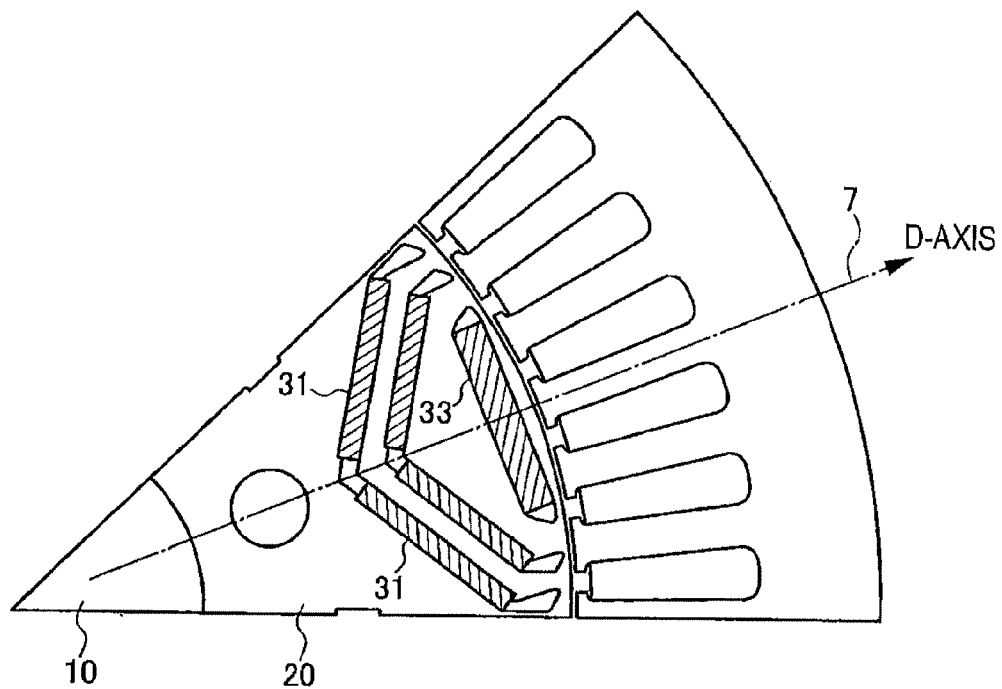
FIG. 9B is a view showing an embodiment in which a permanent magnet is further disposed.

In addition to the above-described embodiments, the permanent magnets may be disposed further. As shown in FIG. 9A, permanent magnets 32 may be disposed at positions that are in parallel to the permanent magnets 31 and are on the outer periphery side from the permanent magnets 31. Alternatively, as shown in FIG. 9B, a permanent magnet 33 may be disposed on the outer periphery side from the permanent magnets 31 to intersect the d-axis (symmetry axis 7) at right angles. Being thus-structured, it is also possible to obtain the effects similar to those of the above-described embodiments.

It is also possible that a nonmagnetic material such as resin, aluminum, stainless steel (SUS) or the like is provided in the gap. Further, the gap may be filled by the nonmagnetic material. The properties to prevent the passing of the magnetic flux can be realized by the nonmagnetic material, similarly to the gap. As the nonmagnetic material functions as the so-called flux barrier to prevent the passing of the magnetic flux, which is the function of the gap, the effects similarly to the above can be realized.

Furthermore, when the gap is molded (when the gap is filled) by the resin or the like, the magnets are fixed inside the rotor core. As a result of this, grinding and cracking of the magnets, due to the movement of the magnets inside the rotor core during driving, can be prevented.

The present application claims priority to Japanese Patent Application No. 2010-169464 filed in Japan Patent Office on Jul. 28, 2010. The contents of this application are incorporated herein by reference in their entirety.

The invention claimed is:

1. A rotating electric machine rotor, comprising:
a rotor core; and
a pair of permanent magnets disposed in a V-shape that opens toward an outer periphery of the rotor core,
wherein:
the pair of permanent magnets is separated in an inner periphery direction of the rotor core, and
the rotor core contains a gap formed by connecting between at least the separated permanent magnets,
wherein:
the rotor core is provided around a rotor shaft,
the gap has a line-symmetric shape viewed in a cross section perpendicular to the rotor shaft, has a base portion on a rotor shaft side reaching a symmetry axis, and has an abutting surface that is convexly provided toward an inside from a rotor shaft side inner wall surface at a base of an inner wall surface facing against a pole face of the permanent magnet and that is abutted against a side surface of the permanent magnet to separate the side surface of the permanent magnet from the symmetry axis,
the pair of permanent magnets is disposed for each gap so that pole faces face against inner wall surfaces of the gap over entire lengths of the pair of permanent magnets, and a side surface abuts only against the abutting surface, when viewed in the cross section perpendicular to the rotor shaft, and
a clearance between magnets as an interval between the permanent magnet and the symmetry axis is made larger as a magnet width as a length of the pole face on an outer periphery side is increased, and made smaller as a magnet thickness is increased.

2. A rotating electric machine rotor, comprising:
a rotor core; and
a pair of permanent magnets disposed in a V-shape that opens toward an outer periphery of the rotor core,
wherein:
the pair of permanent magnets is separated in an inner periphery direction of the rotor core, and
the rotor core contains a gap formed by connecting between at least the separated permanent magnets,
wherein:
the rotor core is provided around a rotor shaft,
the gap has a line-symmetric shape viewed in a cross section perpendicular to the rotor shaft, has a base portion on a rotor shaft side reaching a symmetry axis, and has an abutting surface that is convexly provided toward an inside from a rotor shaft side inner wall surface at a base of an inner wall surface facing against a pole face of the permanent magnet and that is abutted against a side surface of the permanent magnet to separate the side surface of the permanent magnet from the symmetry axis,
the pair of permanent magnets is disposed for each gap so that pole faces face against inner wall surfaces of the gap over entire lengths of the pair of permanent magnets, and a side surface abuts only against the abutting surface, when viewed in the cross section perpendicular to the rotor shaft, and the formula is satisfied between a clearance between magnets Gm as an interval between the permanent magnet and the symmetry axis, a magnet width Wm as a length of the pole face on an outer periphery side, and as magnet thickness Tm:

$$0 < \left(Gm \times \frac{Tm}{Wm}\right) \leq 0.25.$$

3. A rotating electric machine rotor, comprising:
a rotor core; and
a pair of permanent magnets disposed in a V-shape that opens toward an outer periphery of the rotor core,
wherein:
the pair of permanent magnets is separated in an inner periphery direction of the rotor core, and
the rotor core contains a gap formed by connecting between at least the separated permanent magnets, wherein:
the rotor core is provided around a rotor shaft,
the gap has a line-symmetric shape viewed in a cross section perpendicular to the rotor shaft, has a base portion on a rotor shaft side reaching a symmetry axis, and has an abutting surface that is convexly provided toward an inside from a rotor shaft side inner wall surface at a base of an inner wall surface facing against a pole face of the permanent magnet and that is abutted against a side surface of the permanent magnet to separate the side surface of the permanent magnet from the symmetry axis,
the pair of permanent magnets is disposed for each gap so that pole faces face against inner wall surfaces of the gap over entire lengths of the pair of permanent magnets, and a side surface abuts only against the abutting surface, when viewed in the cross section perpendicular to the rotor shaft, and
a tip portion of the gap has a q-axis side inner wall surface formed to be parallel to a q-axis.

* * * * *